(12) United States Patent
Phillips

(10) Patent No.: US 10,963,925 B2
(45) Date of Patent: Mar. 30, 2021

(54) PRODUCT PLACEMENT, PURCHASE AND INFORMATION FROM WITHIN STREAMING OR OTHER CONTENT

(71) Applicant: Seilas Phillips, Pasadena, CA (US)

(72) Inventor: Seilas Phillips, Pasadena, CA (US)

(*) Notice: Subject to any disclaimer, the term of this patent is extended or adjusted under 35 U.S.C. 154(b) by 954 days.

(21) Appl. No.: 15/246,865

(22) Filed: Aug. 25, 2016

(65) Prior Publication Data

US 2017/0061504 A1 Mar. 2, 2017

Related U.S. Application Data

(60) Provisional application No. 62/209,778, filed on Aug. 25, 2015.

(51) Int. Cl.
| | | |
|---|---|---|
| *G06Q 30/02* | (2012.01) | |
| *H04L 29/06* | (2006.01) | |
| *H04L 29/08* | (2006.01) | |
| *G06Q 20/10* | (2012.01) | |

(52) U.S. Cl.
CPC ....... *G06Q 30/0277* (2013.01); *G06Q 20/102* (2013.01); *H04L 65/604* (2013.01); *H04L 67/18* (2013.01)

(58) Field of Classification Search
CPC ...................................................... G06Q 30/02
See application file for complete search history.

(56) References Cited

U.S. PATENT DOCUMENTS

| | | | |
|---|---|---|---|
| 8,150,743 B2 | 4/2012 | Brown | |
| 8,560,405 B1 | 10/2013 | Buron | |
| 2002/0194604 A1 | 12/2002 | Sanchez | |
| 2006/0089843 A1 | 4/2006 | Flather | |
| 2007/0250901 A1* | 10/2007 | McIntire | H04N 21/8586 725/146 |
| 2008/0288600 A1 | 11/2008 | Clark | |
| 2013/0019268 A1 | 1/2013 | Fitzsimmons | |
| 2014/0100993 A1 | 4/2014 | Farmer | |
| 2014/0282638 A1* | 9/2014 | Pequignot | H04N 7/17318 725/5 |
| 2019/0132654 A1* | 5/2019 | Hu | H04N 21/8547 |

FOREIGN PATENT DOCUMENTS

KR 101436413 B1 9/2014

OTHER PUBLICATIONS

Law, Chun Wah Eric, The theory of interactive content-triggered consumer action: Interactive content theory, Hongkong University of Science and Technology (Hongkong), ProQuest Dissertations Publishing, 2000.9991505. 243 pages (Year: 2000).*

(Continued)

*Primary Examiner* — Marilyn G Macasiano
(74) *Attorney, Agent, or Firm* — Graeser Associates International Inc; D'Vorah Graeser

(57) ABSTRACT

Systems, software, and methods are provided for placing product within streaming and other content. Further functionality may include including product information and purchasing options for the product within the streaming and other content. Furthermore, a link to a website may be provided where the product or item may be purchased, or more information is provided.

14 Claims, 16 Drawing Sheets

(56) References Cited

OTHER PUBLICATIONS

Villegas, Jorge, Discrete nagetive emotions generated in an interactive advertisement: An exploration of control as a medium affect, The University of Texas at Austin, ProQuest Dissertations Publishing, 2002.3110698. 233 pages (Year: 2002).*

Cauberghe, Veroline, Determinants of the impact of new advertising formats of interactive digital television advertiser and consumer perspectives, Universiteit Antwerpen (Belgium), ProQuest Dissertations Publishing, 2008.3308699. 299 pages (Year: 2008).*

* cited by examiner

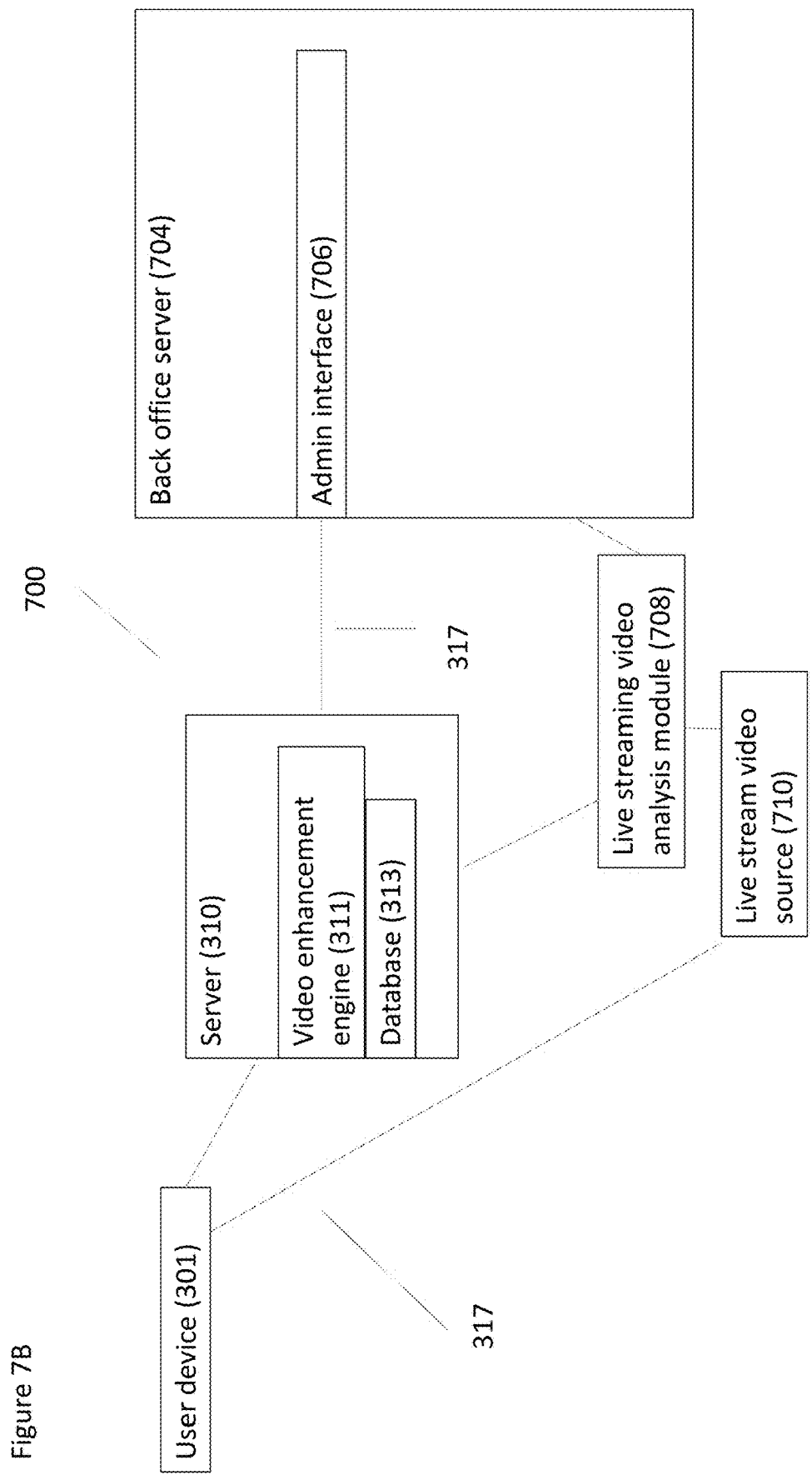

PRODUCT PLACEMENT, PURCHASE AND INFORMATION FROM WITHIN STREAMING OR OTHER CONTENT

FIELD OF THE INVENTION

The present invention, in at least some aspects, relates to a system and method for providing video enhancements for display with video data, and in particular, to such a system and method in which the video enhancements comprise interactive graphic objects.

BACKGROUND OF THE INVENTION

Many different individuals watch streaming and other content, including movies and television shows. These individuals may see products and other items that they want to purchase or want more information about.

It may be difficult to identify the products and other items from within the movie or television show. It may be even further difficult to find the product or item, once it has been identified.

Manufacturers and others may want to place products within streaming and other content to advertise their products and other items. Manufacturers may want to drive consumers to their website, and/or have an increased number of consumers buy their products.

SUMMARY OF AT LEAST SOME EMBODIMENTS

Systems, software, and methods are provided for identifying a placed product within streaming and other content. Further functionality may include providing product information and purchasing options for the product within the streaming and other content. Furthermore, a link to a website may be provided where the product or item may be purchased, or more information is provided.

Furthermore, systems, software and methods are provided for identifying items within content, linking purchasing and information to the content, and providing purchasing options for the items.

According to at least some embodiments, there is provided a method, comprising; receiving content from a content server at a providing system; identifying items within the content; receiving related information about the identified items from an information server at the providing system; associating the content and the related information by the providing system; sending or streaming the associated content and related information, and providing an indicator of the identified items, to a user device; receiving a request to pause the playing or streaming of the content from the user device at the providing system; and providing an indicator generally near the identified item, when, if actuated causes at least a portion of the related information to be provided via the user device.

Optionally, the related information comprises purchasing information.

Optionally, the method further comprises receiving payment data from a user.

Optionally, the method further comprises, after receiving the request to pause the content, receiving a message to play or continue to stream the content.

Optionally, information about the identified items is provided by an entity wishing to sell the identified item.

Optionally, the related information comprises specifications of the identified item.

According to at least some embodiments, there is provided a system comprising a non-volatile computer readable medium and a processor, the medium having stored thereon instructions, which if executed by the processor, cause the processor to:

receive content from a content server at a providing system;

identify items within the content;

receive related information about the identified items from an information server at the providing system;

associate the content and the related information by the providing system;

send, streaming, or transmit the associated content and related information, and provide an indicator of the identified items to a user device;

receive a request to pause the playing or streaming of the content from the user device at the providing system;

provide an indicator generally near the identified item, when, if actuated causes at least a portion of the related information to be provided via the user device, wherein the related information comprises purchasing information, and receive payment information from the user device for purchasing the identified item.

Optionally, the system further comprises instructions which cause the content to continue display.

Optionally, the system further comprises instructions wherein identified item is a product placement item.

According to at least some embodiments, there is provided a system for providing content and related information, comprising:

a content server capable of providing content to be streamed or transmitted;

an item information server capable of providing related information about identified items within the content;

a providing system capable associating the content and the related information; sending or streaming the associated content and related information, and providing an indicator of the identified items to a user device; receiving a request to pause the playing or streaming of the content from the user device; and providing an indicator generally near the identified item, when, if actuated causes at least a portion of the related information to be provided via the user device.

Optionally, the related information comprises purchasing information.

Optionally, the system further comprises receiving payment data from a user by the providing system.

Optionally, the system further comprises, after receiving the request to pause the content, receiving a message to play or continue to stream the content by the providing system.

Optionally information about the identified items is provided by an entity wishing to sell the identified item by placing the product in the content.

According to at least some embodiments, there is provided a system for providing video enhancements to video data, comprising a user device, comprising a video player for playback of the video data and a video enhancement module for providing the video enhancements for the video data, wherein the user device comprises a processor for operating said video player and said video enhancement module; a source for providing the video data to the user device; a video enhancement engine for providing the video enhancements to the user device; wherein upon playback of the video data by said video player, said video enhancement module provides the video enhancements correlating to the video data, such that the video enhancements are displayed through said user device.

Optionally said display of the video enhancements through said user device comprises displaying an indication of availability of the video enhancements.

Optionally at least one said video enhancement comprises a graphic object and wherein said display of the video enhancements through said user device comprises displaying said graphic object through said user device.

Optionally said user device further comprises a display and wherein said video enhancement module causes said graphic object to be displayed on said display in a container, wherein said container is spatially placed on said display such that said graphic object is shown at a particular location within at least one frame of said video data.

Optionally the system further comprises a back office server for providing said video enhancements to said video enhancement engine, and information regarding said particular location of said graphic object within said at least one frame and a timing of display within said video data.

Optionally said back office server further comprises an admin interface for receiving said information regarding said particular location, such that said particular location is determined by manual selection.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computer" on a "computer network", it should be noted that optionally any device featuring a data processor and the ability to execute one or more instructions may be described as a computer, including but not limited to any type of personal computer (PC), a server, a cellular telephone, an IP telephone, a smart phone, a PDA (personal digital assistant), or a pager. Any two or more of such devices in communication with each other may optionally comprise a "computer network".

BRIEF DESCRIPTION OF THE DRAWINGS

FIG. 7B shows an exemplary system for handling live streaming of video according to at least some embodiments of the present invention.

DESCRIPTION OF AT LEAST SOME EMBODIMENTS

Systems, software, and methods are provided for identifying a placed product within streaming or other content. In an example content, such as movies or television shows may be accessed from a content server. Manufacturers and retailers may provide related information about identified items in the content from a purchasing and information server. The content and the related information may be streamed to users, including an indication of the identified items.

The user may then pause the content, after which the indicators (also termed "video enhancements" herein) are shown. Alternatively the indicators may optionally be shown automatically. Indicators may be placed adjacent to the identified items within the video data. The user may click on the indicator, or otherwise indicate they want to more information about the identified item. The more information provided may include purchasing option for the identified item. The user may then provide purchasing information for the item to purchase the item.

Figure 1:
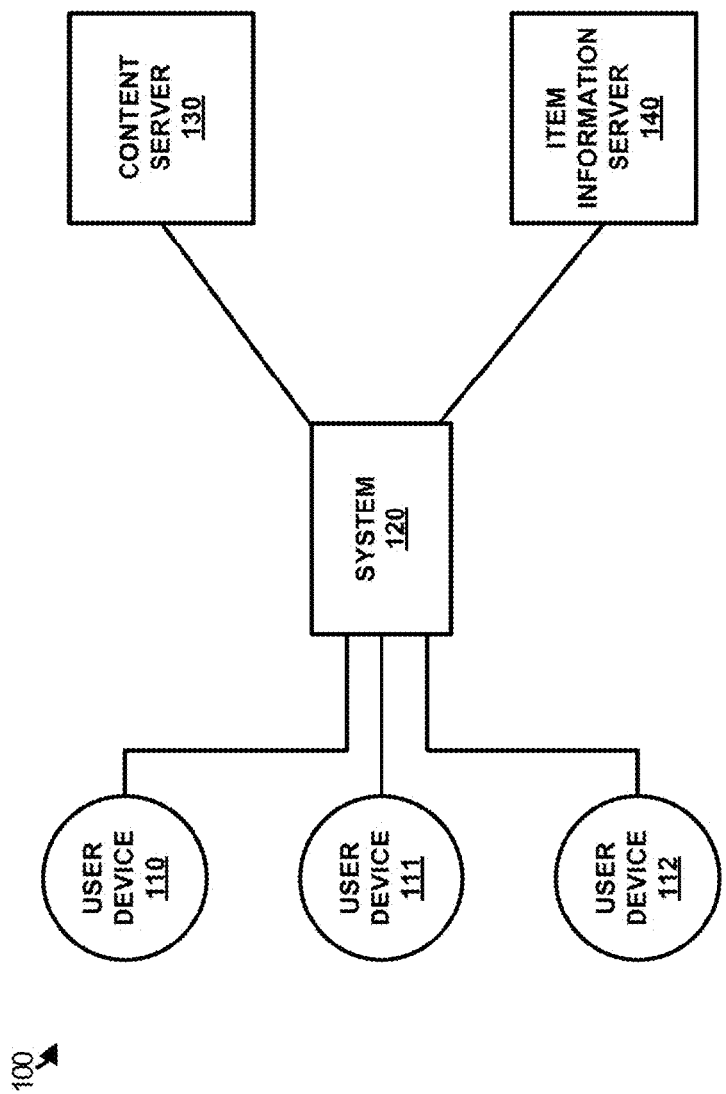
FIG. 1 illustrates a product placement and purchasing system, according to one non-limiting example.

FIG. 1 illustrates a monitoring environment 100 according to one example. System 100 includes user devices 110-112, providing system 120, content server 130, and item information server 140. In FIG. 1, providing system 120 received content from content system 130, receives item information from item information server 140, associates the content with the related information, and sends the associated content and related information to the user device 110-112. System 120 also receives information from the user device 110-112, to control the playing, streaming, or providing of the content and related information. Providing system 120 may also receive purchasing and other information from user devices 110-112.

In an example, user devices 110-112 can include a display capable of displaying content. User devices 110-112 also include a user interface capable of receiving information including user inputs and sending information to the system 120. User device 110-112 can include smart phones, tablets, computers, monitors, televisions, or any other device capable of displaying content and receiving user inputs.

System 120 may can receive content from content server 130, receive information from item information server 140, and receive user information from user devices 110-112. Content may include movies, television shows and other content.

System 120 may receive information related to the item from item information server 140. The related information may be related to identified items in the received content. The related information may include product information, specifications, ratings, and purchasing information, among other information.

System 120 may then associate the related information with the content and present them to the user via user device 110-112. A user may select content to view using indications from user device 110-112 sent to the system 120. The associated content and related information may then be streamed, sent, or otherwise viewable on a user device 110-112.

When an identified item appears in the content, an indication or icon may be made viewable on the user device 110-112, for example near the bottom of the viewable area as shown in FIG. 6. The user may then pause the streaming and/or content. An indicator or icon may appear near or adjacent an identified item. The user may then click or choose the icon, or otherwise indicate the related information should be displayed. The related information may include specifications, purchasing info, a related website, and/or other information related to the identified item.

The user may then purchase the item, go to the website, etc. The user may then unpause, play, or otherwise indicate to the system 120, via the user device 110-112, to resume streaming or providing the content.

With this system, advertisers, manufacturers, retailers, etc. may provide at least a portion of the related information and pay to have their products placed and identified. Users may watch the content and related information and may receive more information about identified products, while viewing the movie, television show, etc. This may make it more likely that a user will purchase an identified item.

Advertisers, etc. may also pay to place their products and items within the original content, and provide the related information to enhance the user experience and make it more likely a user will purchase the item.

Figure 2:
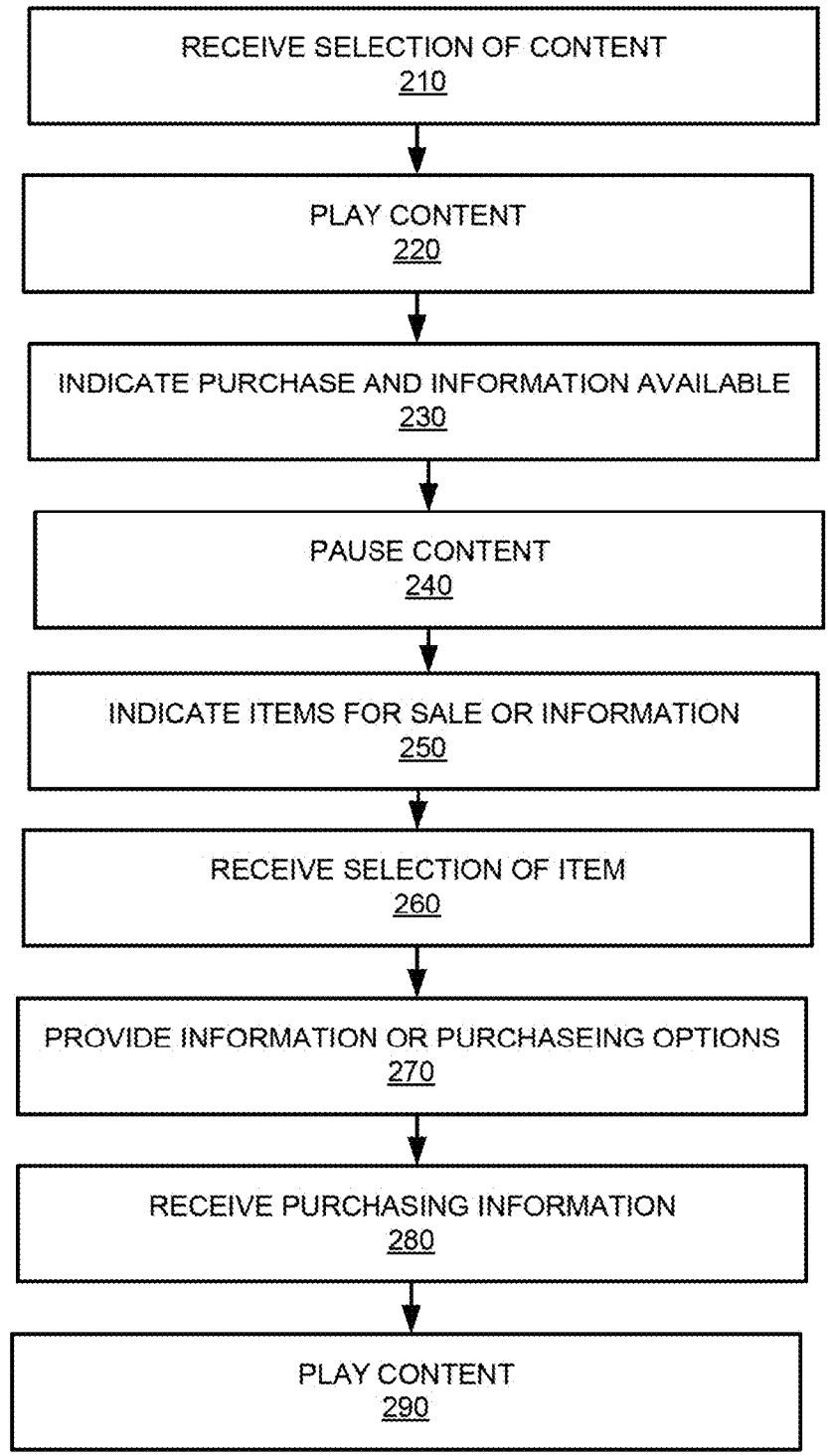
FIG. 2 illustrates a method according to one non-limiting example.

FIG. 2 illustrates a monitoring method 200 for providing content and information related to identified items, according to an example. The method begins with the system 120 receiving content and related information. One or more selections of content may be presented to a user at least in part via a user device 110-112. A user may then select the content to view via a user device 110-112 (step 210). This user device may include a smart phone, tablet computer, laptop, computer, monitor, television, or any other device configured to receive and play content, and receive and send user inputs.

The content and related information may then be sent or streamed to the user device 110-112.

The user may then indicate to play or stream the content (220) from the system 120 to a user device 110-112. The content and indications of identified items may be presented (230) at the user device. The user may then indicate to pause the content (240), which may be received at the system 120. Icons or other indications adjacent identified items for sale, or with other related information, may be presented (250). The user may click to see the related information (260), which may include purchase information (270).

If the user wishes to purchase the item, the user may enter payment and shipping information, and the item may be ordered (280). Alternatively, the user may be redirected to a website to purchase the item.

Once the user has viewed the related information, or purchased the item, the user may indicate to the system 120 to resume providing, playing, and/or streaming the content (290).

Although the example method is described as a method for purchasing items from a movie, or television show, it should be understood that the method could apply to any situation for providing related information for items within the content. Additionally, it should be understood that the order of events in method 200 could be rearranged or accomplished concurrently by various different devices, etc.

Figure 3A:
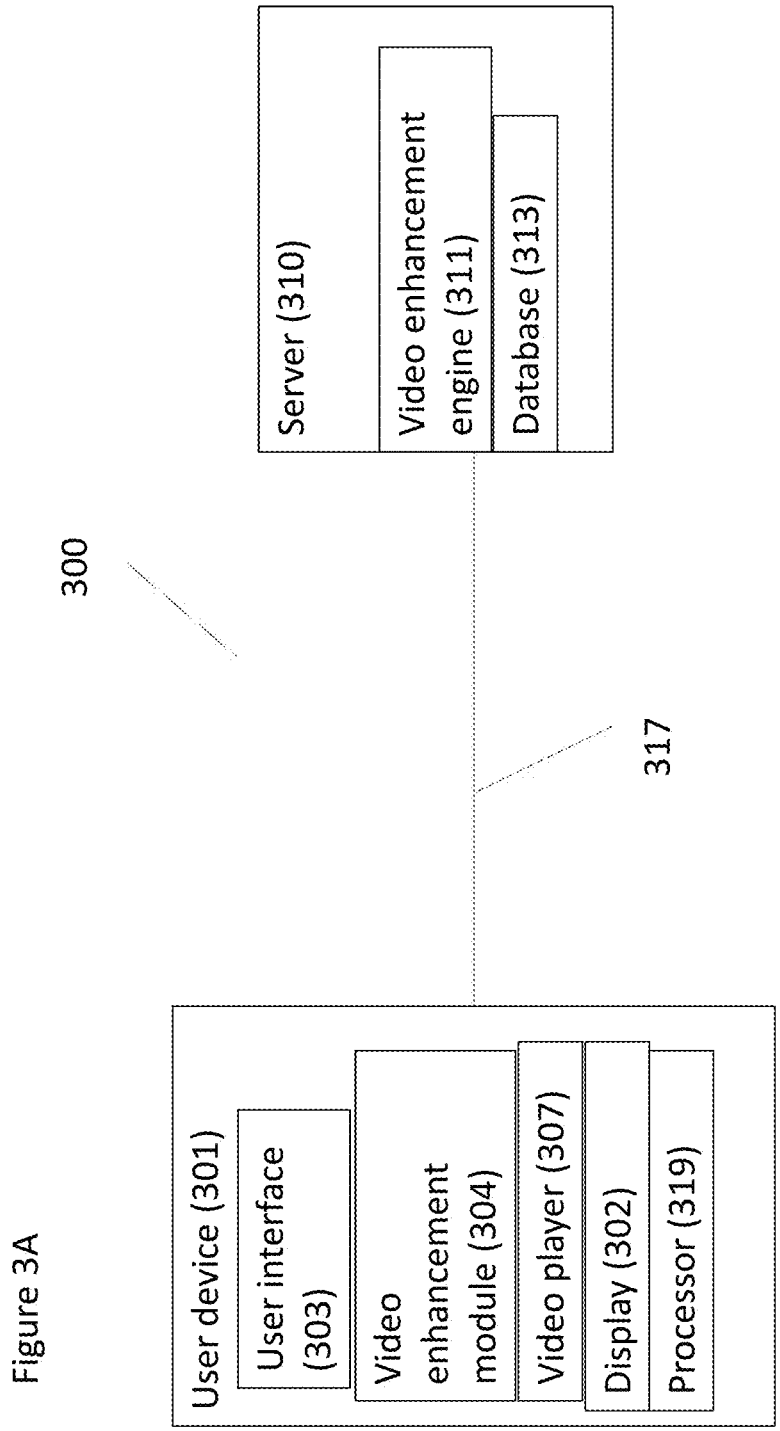
FIGS. 3A and 3B feature a system according to at least some non-limiting embodiments of the present invention.
Figure 3B:
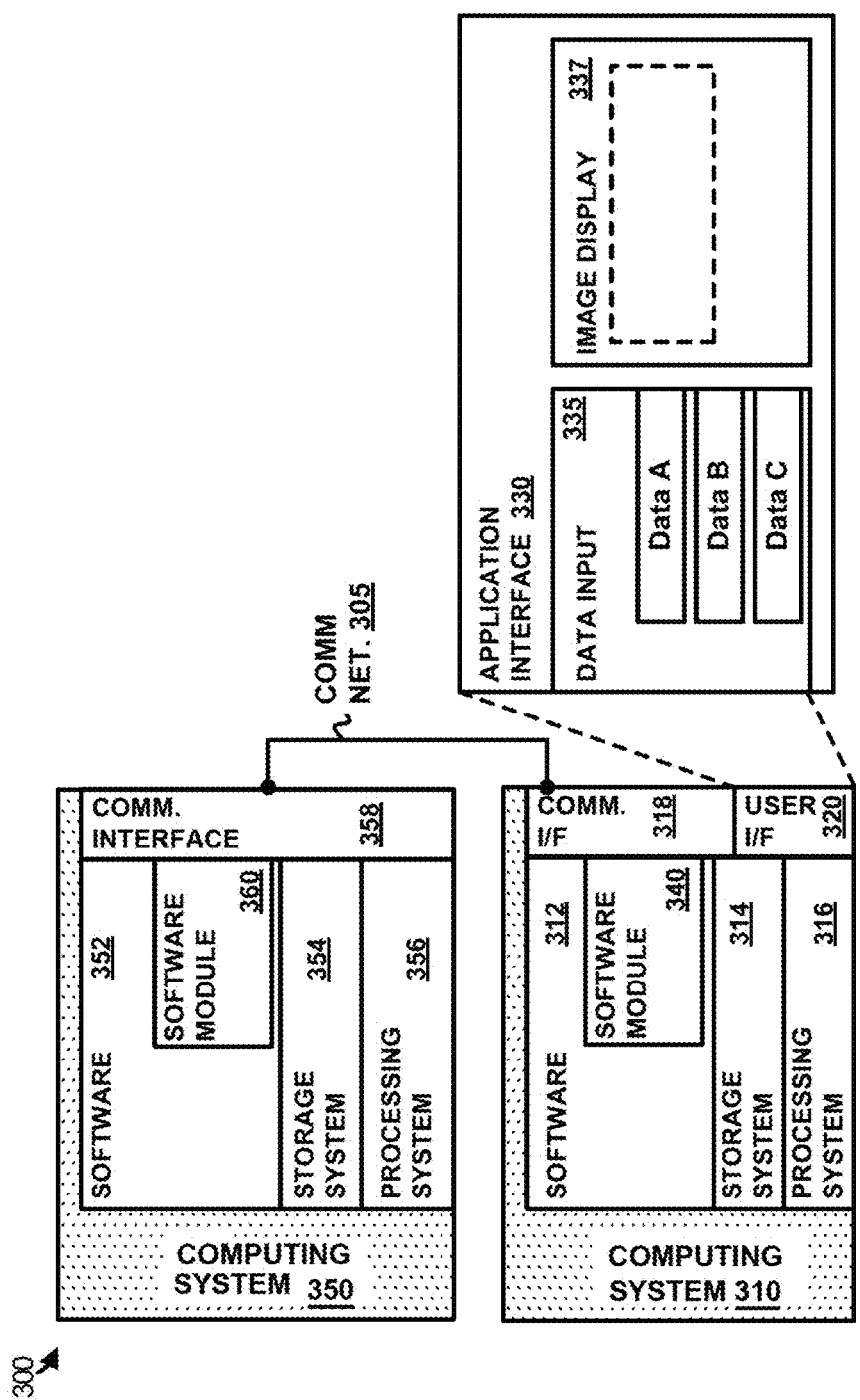

FIGS. 3A and 3B illustrate a system 300 according to at least some embodiments of the present invention. Turning now to FIG. 3A, as shown system 300 includes a user device 301 communicating with a server 310 through a network 317, such as the internet for example. User device 301 operates a user interface 303 which enables the user to control display of video data and also to interact with the video enhancements as described in greater detail below. User device 301 comprises a processor 319 for operating the various components as described herein, including user interface 303 for example.

User interface 303 in turn can be used to control the actions of a video enhancement module 304, which in combination with a video player 307, enables the video enhancements to be displayed to the user through a display 302. Video enhancement module 304 may optionally be combined with video player 307. When video data is to be displayed to the user through display 302 (which may optionally be separate from user device 301), video player 307 interacts with display 302 to cause this display.

Video enhancement module 304 is preferably able to analyze the actions of video player 307, for example in terms of the video display, including but not limited to starting display of video data, pausing display of video data, stopping display of video data and timing of the video data being displayed. In terms of timing of the video data, video data may optionally relate to discrete units of video data, termed "clips", "movies", "programs" and the like. Each such unit has timing associated with it; for example, for a video unit that is 2 minutes long, it is possible to specify a particular location within the video unit according to time elapsed since the start of playback or display. Video enhancement module 304 is preferably able to determine such timing according to information received from video player 307.

One exception to this rule of timing relates to live streaming of video data of a live event (if the event has been recorded, then it too will have been converted to a discrete unit of video data). However for a live stream, optionally the object shown in the video, to which a video enhancement is correlated, is stationary within the video. Alternatively coordinates may optionally be predetermined for the correlation. Also alternatively, image recognition may optionally be used to locate the object to which the video enhancement is correlated. A more detailed, non-limiting embodiment is described in FIG. 7B.

Video enhancement module 304 may optionally communicate directly with video player 307, for example through an API (application programming interface). Alternatively, video enhancement module 304 may optionally be integrated with video player 307. Also alternatively, video enhancement module 304 may optionally listen to system calls made through the operating system for user device 301 (not shown) to determine the behavior of video player 307.

Video enhancement module 304 then determines which action(s) should be taken according to the operations of video player 307. For example and without limitation, when the user wishes to view video data, video player 307 is able to identify the video data in question, for example as a file on user device 301 or alternatively as data streamed from server 310, for example from a video enhancement engine 311 or another video server, such as a CDN (content delivery network; not shown). The computational device providing the video data is also described herein as the source of the video data. Video enhancement module 304 then determines which enhancements are required for display with, on, next to, or otherwise in conjunction with the video data. Preferably, video enhancement module 304 transmits identification of the video data to server 310 (particularly if server 310 does not actually serve the video data). Video enhancement engine 311 then preferably retrieves the enhancement information from a database 313 and returns this information to video enhancement module 304.

Upon receipt of the enhancement information, video enhancement module 304 then causes the enhancement information to be displayed as described above. For example and without limitation, video enhancement module 304 may optionally cause one or more graphic objects to appear as an overlay to at least part of the image of the video data. Optionally, such graphic objects are displayed in correlation with an object that appears in that part of the image, as described in greater detail below. For ease of operation, optionally and preferably the graphic objects are displayed according to the timing of the video data. Video enhancement module 304 may optionally receive a list of one or more graphic object(s) to be displayed, the time during which each is to be displayed in terms of the video data timing (for example, from 1 minute, 30 seconds to 1 minute, 45 seconds) and also the relative location within the frame. Relative location within the frame may optionally be determined on the fly, as may the video data timing, by video enhancement module 304; however preferably both relative location and video data timing are provided by video enhancement engine 311.

Optionally and preferably, display of the graphic object(s) is controlled according to an action of the user, for example by indicating a desire to pause display of the video data by video player 307. Such a desire may optionally be indicated by pressing a "pause button" as displayed to the user through display 302, or even as a physical button. In this example, once the user causes the video data to pause, then video enhancement module 304 causes the graphic objects to be displayed. Alternatively, the graphic objects may be displayed without any action by the user.

If the user interacts with a graphic object, for example by selecting it through user interface 303, then optionally a separate window or other informational display is provided to the user through display 302. Video enhancement module 304 provides the information necessary for this additional display to be made, whether as an overlay to the video data display or near to it. The user may optionally be offered to purchase an object on screen associated with the graphic object and/or may optionally be offered more information about the onscreen object, as described in greater detail below.

Once the user indicates that video data display should continue, for example by pressing "play", or the timed period of display ends, the graphic object is no longer displayed through display 302.

Turning now to FIG. 3B, some aspects of system 300 are shown in more detail, including computing system 310 and computing system 350. Computing system 310, in the present example, corresponds to user device 110-112, and computing system 350 corresponds to system 120. Computing system 310 can include any smart phone, tablet computer, laptop computer, computer, monitor, television, or other computing or mobile device capable of streaming or showing content and receiving user inputs. Computing system 350 can include any server computer, desktop computer, laptop computer, or other device capable of receiving and associating item information with content, and presenting the associated content and relate information.

In FIG. 3B, computing system 310 includes processing system 316, storage system 314, software 312, communication interface 318, and user interface 320. Processing system 316 loads and executes software 312 from storage system 314, including software module 340. When executed by computing system 310, software module 340 directs processing system 316 to receive data and show content. Such data could include any of the information described above, including but not limited to the functionality described herein.

In more detail, if computing system 310 optionally corresponds to a user device as described above, then software module 340 optionally relates to video enhancement module 304, which provides the video enhancements.

Although computing system 310 includes one software module in the present example, it should be understood that one or more modules could provide the same operation. Similarly, the computing systems may be distributed using other computing systems and software.

Additionally, computing system 310 includes communication interface 318 that can be further configured to send and receive information from computing system 350 using communication network 305. Communication network 305 could include the Internet, cellular network, satellite network, RF communication, blue-tooth type communication, near field, or any other form of communication network capable of facilitating communication between computing systems 310, 350. Computing system 350 may optionally comprise the previously described server, such that software module 360 may optionally relate to the previously described video enhancement engine 311.

Referring still to FIG. 3B, processing system 316 can comprise a microprocessor and other circuitry that retrieves and executes software 312 from storage system 314. Processing system 316 can be implemented within a single processing device but can also be distributed across multiple processing devices or sub-systems that cooperate in executing program instructions. Examples of processing system 316 include general purpose central processing units, application specific processors, and logic devices, as well as any other type of processing device, combinations of processing devices, or variations thereof.

Storage system 314 can comprise any storage media readable by processing system 316, and capable of storing software 312. Storage system 314 can include volatile and nonvolatile, removable and non-removable media implemented in any method or technology for storage of information, such as computer readable instructions, data structures, program modules, or other data. Storage system 314 can be implemented as a single storage device but may also be implemented across multiple storage devices or sub-systems. Storage system 314 can comprise additional elements, such as a controller, capable of communicating with processing system 316.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal.

Although one software module is shown, the software may be distributed across many devices, storage media, etc.

User interface 320 can include a mouse, a keyboard, a camera, image capture, a Barcode scanner, a QR scanner, a voice input device, a touch input device for receiving a gesture from a user, a motion input device for detecting non-touch gestures and other motions by a user, a pointing device, remote control, and other comparable input devices and associated processing elements capable of receiving user input from a user. These input devices can be used for providing inputs for the system as described throughout this disclosure. Output devices such as a graphical display, monitor, television screen, speakers, printer, haptic devices, and other types of output devices may also be included in user interface 320. The aforementioned user input and output devices are well known in the art and need not be discussed at length here.

Application interface 330 can include data input 335 and image display 337. In one example, data input 335 can be used to collect information from a user or other system. Further, application interface 330 could include image display 337 that could be used to show content and provide a pointer for use with the data input 335 to define user inputs. It should be understood that although computing system 310 is shown as one system, the system can comprise one or more systems to collect data.

Computing system 350 includes processing system 356, storage system 354, software 352, and communication interface 358. Processing system 356 loads and executes software 352 from storage system 354, including software module 360. When executed by computing system 350, software module 360 directs processing system 310 to receive content and associate item information with the content, and receive user inputs and other functionality as described throughout this disclosure.

Additionally, computing system 350 includes communication interface 358 that can be configured to send and receive data from computing system 310 using communication network 305.

Referring still to FIG. 3B, processing system 356 can comprise a microprocessor and other circuitry that retrieves and executes software 352 from storage system 354. Processing system 356 can be implemented within a single processing device but can also be distributed across multiple processing devices or sub-systems that cooperate in executing program instructions. Examples of processing system 356 include general purpose central processing units, application specific processors, and logic devices, as well as any other type of processing device, combinations of processing devices, or variations thereof.

Storage system 354 can comprise any storage media readable by processing system 356, and capable of storing software 352 and data from computing system 310, and other systems such as a content system and an item information system. Data from computing system 310 may be stored in a word, excel, or any other form of digital or other file or information. Storage system 354 can include volatile and nonvolatile, removable and non-removable media implemented in any method or technology for storage of information, such as computer readable instructions, data structures, program modules, or other data. Storage system 354 can be implemented as a single storage device but may also be implemented across multiple storage devices or sub-systems. Storage system 354 can comprise additional elements, such as a controller, capable of communicating with processing system 356.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal.

In some examples, computing system 350 could include a user interface 320 as shown herein. The user interface can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a graphical display, speakers, printer, haptic devices, and other types of output devices may also be included in the user interface. The aforementioned user input and output devices are well known in the art and need not be discussed at length here.

It should be understood that although computing system 350 is shown as one system, the system can comprise one or more systems to perform the functionality as described throughout this disclosure.

In regard to application interface 330, optionally the user is able to control interactions with the video enhancements, such as the previously described graphic objects through application interface 330. Application interface 330 may optionally comprise an overlay to user interface 320. For example and without limitation, if computing system 310 comprises a tablet computer, then a user will typically choose to interact with the tablet computer through a touch screen, which in this example may optionally be included in user interface 320. Software module 340 could then optionally cause application interface 330 to include a container or window that covers part or all of such a touch screen. The appearance of such a container to the user could be transparent, such that the user does not see a separate container through the display. However, each time the user touched a part of the touch screen covered by the container, the container could signal software module 340 regarding the user's actions, such as clicking on or otherwise selecting a graphic object.

U.S. Pat. No. 9,037,997 to Bas Ording describes a process for ordering different containers according to different criteria, as well as for handling overlapping containers on a user interface operated by a computational device, and is hereby incorporated by reference as if fully incorporated herein.

Figure 4:
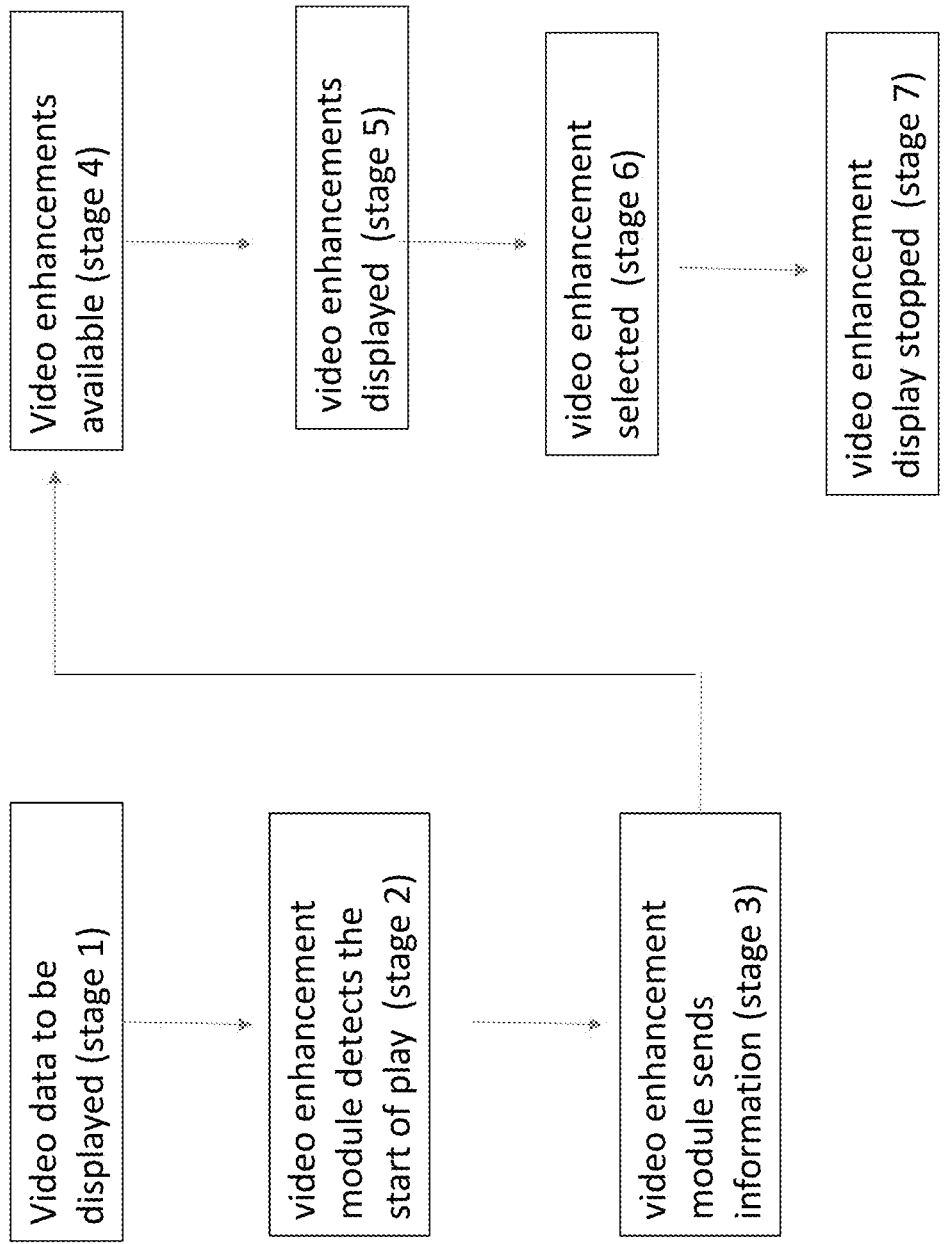
FIG. 4 shows an exemplary, non-limiting process for enabling the display of the graphic objects to the user through the user device according to at least some non-limiting embodiments of the present invention.

FIG. 4 shows an exemplary, non-limiting process for enabling the display of the graphic objects to the user through the user device. In stage 1, the user indicates that video data is to be displayed, for example by selecting a clip for display by a video player that is operated by a user device (for example as described herein).

In stage 2, the video enhancement module detects the start of play and sends the video identification information to a separate video enhancement engine, which may optionally be operated by a separate server.

In stage 3, the video enhancement engine sends enhancement information to the video enhancement module, preferably including the nature of the enhancement (such as a graphic object), how it is to be displayed and timing of display in relation to the timing of the display of the video data.

In stage 4, the video enhancement module optionally causes the user device display to indicate that video enhancements are available, for example according to the timing of the video data playback. For example, the video enhancement module may optionally control a container that overlays the interface and/or display of the video player, in which case such an indication regarding the availability of video enhancements may displayed next to or as an overlay to the video player display and/or user interface. A "container" is a unit of a user interface that is controlled by the operating system of the user device. Containers may optionally overlap in terms of their location on the display screen of the user device. Optionally a container may only be active once selected by the user through the user interface; alternatively more than one container may be active.

In stage 5, optionally an action by the user through the user interface causes the video enhancements to be displayed. For example, the user may optionally click on or otherwise select the information regarding the video enhancements through the previously described container. Additionally or alternatively, the user may cause the video player to take an action, such as pausing display of the video data, which is then detected by the video enhancement module. The video enhancement module may then cause the video enhancements to be displayed upon detection of this action of the video player.

As described above, the video enhancements may optionally be displayed in a container that is overlaid over at least the part of the user interface related to the video player and the display of the video data. For example and without limitation, the video enhancements may optionally comprise graphic elements that located within the container such that they appear to correlate with objects being shown on the display of the video data. For example, such a graphic object may optionally appear over or next to a watch that is being shown in the display of the video data.

Optionally the graphic object may be a control element and/or may be an interactive component, which cause an action to occur when the user selects or otherwise interacts with it, for example by clicking on it.

In stage 6, optionally the user selects a video enhancement, such as a graphic object, for example by clicking on it through the user interface. Such a selection may optionally be detected through the previously described container, which can be used to detect the location of the user selection (for example by touching a touch screen at a particular location) by the video enhancement module. The video enhancement module then correlates such detection optionally and preferably with an action to be taken upon selection of that graphic object.

If the user does not select such a graphic object, optionally in stage 7 the display of the video enhancements may optionally stop, whether due to timing out after a certain period of time or because the user indicated another action to be taken by the video player (such as resumption of playback), and/or because the user indicated that the display should stop through another aspect of the user interface.

Figure 5:
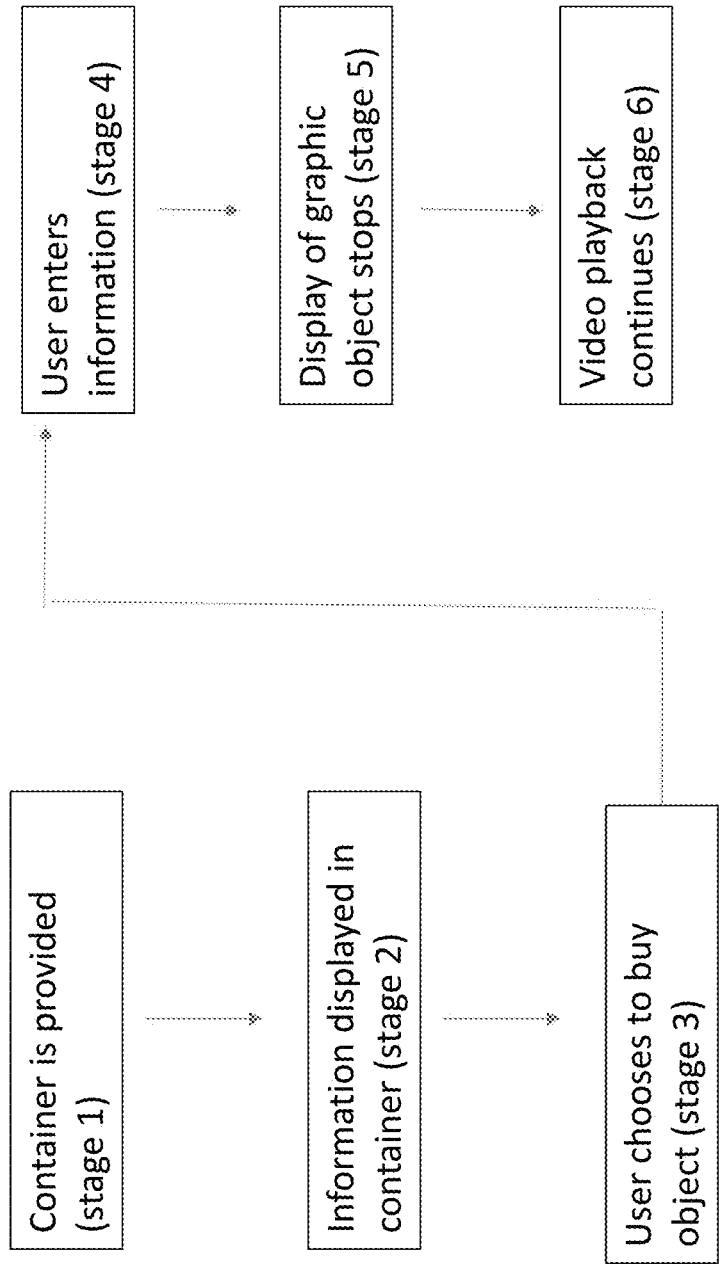
FIG. 5 shows an exemplary, non-limiting process for enabling the selection of one or more graphic objects according to at least some non-limiting embodiments of the present invention.

FIG. 5 shows an exemplary, non-limiting process for enabling the display of additional information after selection of a graphic object by the user through the user device. In stage 1, a container is preferably provided for the display of the additional information, for example optionally as an overlap as described above. In stage 2, the video enhancement module preferably causes the information to be displayed within the container.

In stage 3, the user may optionally choose to buy the object correlated with the graphic object according to the displayed information, for example by clicking on a "buy now" graphic object, such as a button, in the displayed information. The graphic object may optionally be connected to a hyperlink, for example to connect the user to an ecommerce website, or alternatively may optionally connect directly to a purchase option as is known in the art. If the user had provided personalization information previously, whether to the video enhancement module or alternatively to another software on the user device and/or to an e-commerce provider, then optionally credit card details, shipping address and the like could already be stored and provided automatically. Otherwise the user would need to provide such information in stage 4.

In stage 5, the display of the graphic objects optionally ceases, for example as described above. Video playback may optionally continue in stage 6. Stages 5 and 6 may also optionally be performed as described above if the user doesn't purchase the object.

FIGS. 6A-6H show an exemplary visualization of the processes of FIGS. 4 and 5 from the perspective of the user.

Figure 6A:
FIGS. 6A-6H show an exemplary visualization of the processes of FIGS. 4 and 5 from the perspective of the user.
Figure 6B:
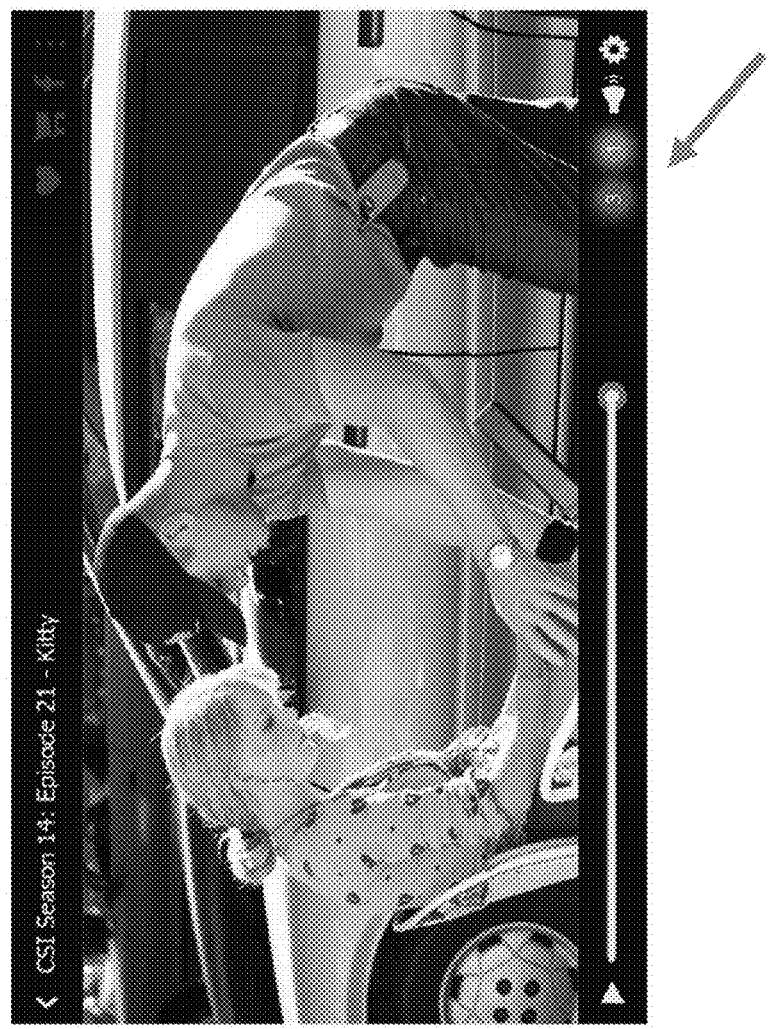

FIG. 6A shows video content being played, within a discrete unit of video content, such as a television program. In FIG. 6B, due to a trigger, the availability of video enhancements is indicated, as shown by the arrow (which itself does not form part of the display). The trigger may optionally be according to timing of the video data playback as previously described. In this non-limiting example, 3 purchase enhancements are available (shown as the number 3 in a green circle) and 1 informational enhancement is available (shown as the number 1 in a red circle). Of course, many other visual indications could optionally be used in place of, or in addition to, these visual indications.

Figure 6C:

In FIG. 6C, the user is optionally urged to press pause in order to see what these video enhancements relate to, as shown by the non-limiting example of the text message and arrow.

Figure 6D:

In FIG. 6D, graphic objects are shown that correlate to the video enhancements, in this non-limiting example optionally shown as product placements. For this non-limiting example, graphic objects that relate to or enable purchase of a product are shown as red circles, while the graphic object that relates to or enables provision of more information is shown as a green circle. Again, of course, many other visual indications could optionally be used in place of, or in addition to, these visual indications.

Figure 6E:

In FIG. 6E, a particular graphic object has been selected, for example by being clicked on by the user, and is optionally now shown without the display of the other graphic objects.

Figure 6F:
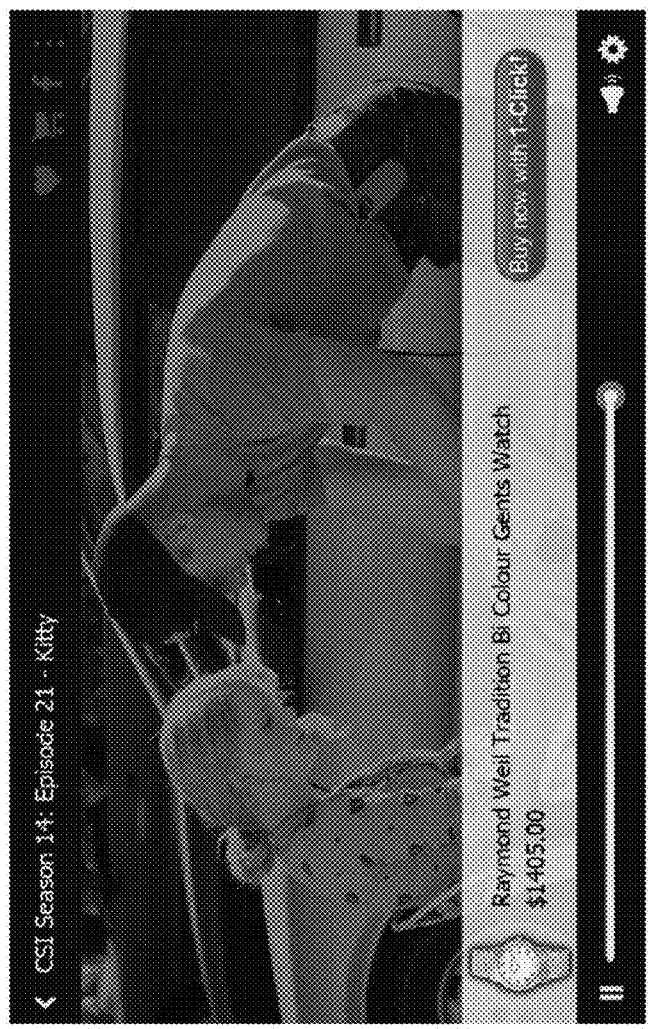

In FIG. 6F, product information is now displayed, related to the graphic object selected, which in this non-limiting example was a purchase enablement object. The display is optionally provided as an overlay to the video display as shown. Additionally or alternatively, the user is provided with the opportunity to buy the object, shown through the non-limiting example of the "buy now with one click" graphic object button.

Figure 6G:
Figure 6H:

In FIG. 6G, a different graphic object has been selected and is now shown alone, without the other graphic objects. As this graphic object related to the display of additional information, in FIG. 6H such information is shown, again optionally as an overlay.

Figure 7A:
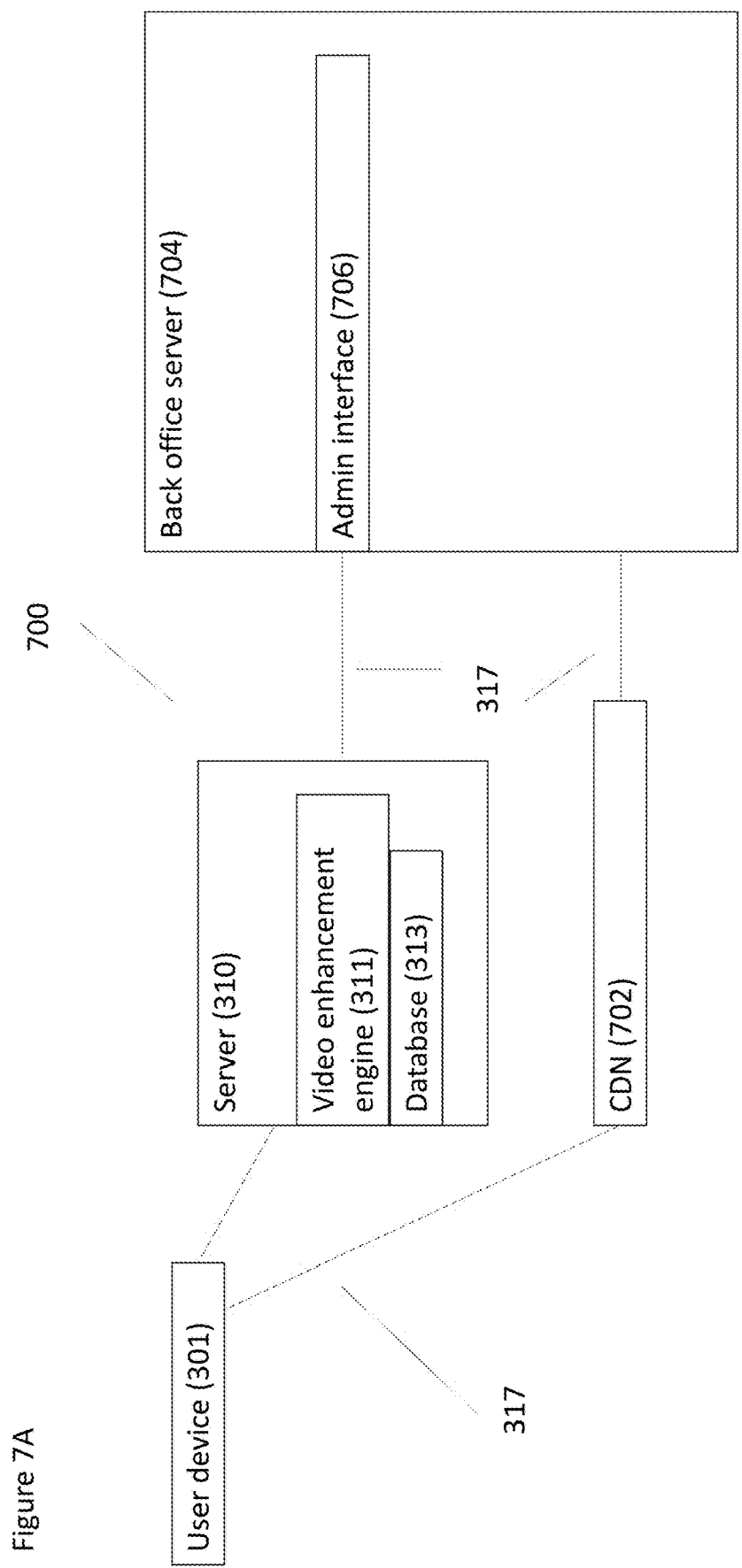
FIG. 7A shows an exemplary system according to at least some embodiments of the present invention for determination of the timing and nature of the video enhancements.

FIG. 7A shows an exemplary system according to at least some embodiments of the present invention for determination of the timing and nature of the video enhancements. A system 700 features server 310, video enhancement engine 311 and database 313 as previously described. System 700 also preferably features a CDN (content delivery network) 702 for delivery of video data, whether for streaming or downloading. Although not shown, CDN 702 may optionally be in contact with server 310 to provide video identification information when video data is selected for display. CDN 702 is also preferably in contact with user device 301 through network 317.

A back office server 704 preferably enables video enhancements to be loaded into database 313 and associated with particular video data, such as a particular video clip for example. Back office server 704 is preferably in contact with at least server 310 and optionally also CDN 702 through network 317.

Back office server 704 optionally and preferably features an admin interface 706, through which an admin user may optionally select video data for adding video enhancements, preferably as discrete video units as described herein. Videos may optionally be uploaded directly to CDN 702 and/or to back office server 704, but preferably at least the video identification information and the video enhancements are uploaded through admin interface 706.

Optionally video enhancements are connected to specific portions of the video data through image analysis and identification of objects. Alternatively and preferably, the admin user identifies the portion of the video data according to at least timing of the video as described herein, but preferably also according to location within the frame(s) of the video data. The spatial location may optionally be relative to the frame or as an absolute identification. To avoid "jitter" of the video enhancements when including graphic objects, optionally and preferably only one frame is selected for receiving the graphic objects through admin interface 706. In this example, when the user indicates an interest in seeing the graphic objects and/or upon automatic display, the specific selected frame is displayed, even if this display requires that video data be forwarded or reversed slightly to show the frame in question.

The admin user may also optionally select various options as described herein for indicating the availability of the video enhancements, for connecting them to information and/or purchase options, and/or for determining when and how the enhancements are to be displayed, through admin interface 706.

FIG. 7B shows an exemplary system for handling live streaming of video according to at least some embodiments of the present invention. Optionally for live streaming, image recognition could be used to determine the trigger for determining when to display availability of the video enhancement and/or where and when to display the video enhancement. Alternatively, the video enhancement could be placed statically at a fixed location in the image or to the side of the image.

FIG. 7B shows a particular, non-limiting implementation of system 700, featuring a number of the components shown in FIG. 7A. In this implementation, a live stream video source 710 provides the live stream of the video to user device 301. The live stream is preferably also received and analyzed by a live streaming video analysis module 708, which optionally and preferably uses image recognition to determine where to place the video enhancements when being displayed (although any other method described herein could also be used).

Admin interface 706 is preferably used to enter or select the video enhancements, and to determine the connection between such enhancements and some type of action as described herein, such as displaying information and/or an opportunity to buy a product. Admin interface 706 and live streaming video analysis module 708 preferably communicate so that live streaming video analysis module 708 knows which objects on the video data are of interest, if image recognition is being used.

Information regarding the video enhancements is then provided from back office server 704 to server 310 as described herein. Also the location of the video enhancements is provided from live streaming video analysis module 708 to server 310. Server 310 then uses this information as previously described to provide the video enhancements, their location and when to display them (or indicate that they are available) to user device 301 as previously described.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. Furthermore, different combinations and subcombinations of the various embodiments described herein may optionally be combined from the teachings herein. As a result, the invention is not limited to the specific implementations described above, but only by the claims and their equivalents.

What is claimed is:

1. A method, comprising;
receiving content from a content server at a providing system;
identifying items within the content by the providing system;
receiving related information about the identified items from an information server at the providing system;
associating the content and the related information by the providing system; sending or streaming the associated content and related information from the providing system, and providing an indicator of the identified items from the providing system, to a user device;
receiving a request to pause the playing or streaming of the content from the user device at the providing system; and
providing an indicator generally near the identified item, when, if actuated causes at least a portion of the related information to be provided via the user device,
wherein the indicator is a video enhancement comprising a interactive graphic object;
wherein the providing system comprises a processor, a non-volatile computer readable medium having stored thereon instructions that are executed by the processor, a database for storing enhancement information containing relative location data and video data timing, and a video enhancement engine for retrieving enhancement information from the database and providing the video enhancements and the enhancement information to the user device;
wherein the user device comprises a video player for playback of video data, a video enhancement module for providing the video enhancements for the video data, and a processor for operating a video player and the video enhancement module, where the video enhancement module receives enhancement information and uses the enhancement information to provide the indicator generally near the identified item, when, if actuated causes at least a portion of the related information.

2. The method of claim 1, wherein the related information comprises purchasing information.

3. The method of claim 2, further comprising receiving payment data from a user.

4. The method of claim 1, further comprising, after receiving the request to pause the content, receiving a message to play or continue to stream the content.

5. The method of claim 1, wherein information about the identified items is provided by an entity wishing to sell the identified item.

6. The method of claim 1, wherein the related information comprises specifications of the identified item.

7. A system comprising a processor, a database for storing enhancement information containing relative location data and video data timing, a non-volatile computer readable medium having stored thereon instructions, which if executed by the processor, cause the processor to:
  receive content from a content server at a providing system; identify items within the content;
  receive related information about the identified items from an information server at the providing system;
  associate the content and the related information by the providing system; send, streaming, or transmit the associated content and related information, and provide an indicator of the identified items to a user device;
  receive a request to pause the playing or streaming of the content from the user device at the providing system;
  provide an indicator generally near the identified item, when, if actuated causes at least a portion of the related information to be provided via the user device, wherein the related information comprises purchasing information, and receive payment information from the user device for purchasing the identified item,
  wherein the indicator is a video enhancement comprising a interactive graphic object;
  wherein the user device comprises a video player for playback of video data, a video enhancement module for providing the video enhancements for the video data, and a processor for operating a video player and the video enhancement module, where the video enhancement module receives enhancement information and uses the enhancement information to provide the indicator generally near the identified item, when, if actuated causes at least a portion of the related information.

8. The system of claim 7, further comprising instructions which cause the content to continue display.

9. The system of claim 7, further comprising instructions wherein identified item is a product placement item.

10. A system for providing content and related information, comprising:
  a content server capable of providing content to be streamed or transmitted;
  an item information server capable of providing related information about identified items within the content;
  a providing system capable associating the content and the related information; sending or streaming the associated content and related information, and providing an indicator of the identified items to a user device; receiving a request to pause the playing or streaming of the content from the user device; and providing an indicator generally near the identified item, when, if actuated causes at least a portion of the related information to be provided via the user device,
  wherein the indicator is a video enhancement comprising an interactive graphic object;
  wherein the providing system comprises a processor, a non-volatile computer readable medium having stored thereon instructions that are executed by the processor, a database for storing enhancement information containing relative location data and video data timing, and a video enhancement engine for retrieving enhancement information from the database and providing the video enhancements and the enhancement information to the user device;
  wherein the user device comprises a video player for playback of video data, a video enhancement module for providing the video enhancements for the video data, and a processor for operating a video player and the video enhancement module, where the video enhancement module receives enhancement information and uses the enhancement information to provide the indicator generally near the identified item, when, if actuated causes at least a portion of the related information.

11. The system of claim 10, wherein the related information comprises purchasing information.

12. The system of claim 11, further comprising receiving payment data from a user by the providing system.

13. The system of claim 10, further comprising, after receiving the request to pause the content, receiving a message to play or continue to stream the content by the providing system.

14. The system of claim 10, wherein information about the identified items is provided by an entity wishing to sell the identified item by placing the product in the content.

* * * * *